Feb. 28, 1956  S. S. DICKINSON  2,736,579
AXIAL CONTACT SEAL
Filed Feb. 21, 1951

Inventor
Sherman S. Dickinson
by
Attorney

United States Patent Office 2,736,579
Patented Feb. 28, 1956

2,736,579

AXIAL CONTACT SEAL

Sherman S. Dickinson, Santa Rosa, Calif., assignor to Allis-Chalmers Manufacturing Company, Milwaukee, Wis.

Application February 21, 1951, Serial No. 212,103

11 Claims. (Cl. 286—11)

The invention relates to rotary seals of the axial contact type, that is, seals of the type in which an axially movable sealing ring has a sealing surface at one side for cooperative engagement with a complementary sealing surface, and in which a resilient backing unit is arranged at the other side of the sealing ring and urges it axially into cooperative engagement with said complementary sealing surface.

A copending application, Serial No. 781,668, filed on October 23, 1947, by Bernard J. Murphy, for Axial Contact Seal, now U. S. Patent 2,685,464, issued August 3, 1954, discloses a seal of the above mentioned character in which a circumferential series of balls between the sealing ring and a supporting structure permit substantially frictionless axial back and forth movement of the ring relative to the supporting structure, and in which the balls are pocketed partly in the sealing ring and partly in the supporting structure so that the balls will not only support the sealing ring for axial back and forth movement but also center the ring accurately and prevent it from rotating on its axis relative to the supporting structure.

Generally, it is an object of the present invention to provide an improved seal of the axial contact type incorporating a circumferential series of balls for mounting a sealing ring in axially shiftable, radially centered and circumferentially locked condition on a supporting structure.

More specifically, it is an object of the invention to provide a seal of the above mentioned character incorporating a casing adapted for press fitted engagement with a supporting structure, and in which the sealing ring is supported for axial back and forth movement and is radially centered by direct coaction of the balls with the ring and supporting structure while the ring is prevented from rotating on its axis by coaction of the balls with the casing.

A further object of the invention is to provide an improved axial contact type seal unit comprising a casing, a sealing ring, mounting balls for the sealing ring, and a resilient backing unit for the sealing ring, all combined to form a compact self-contained unit which may readily be handled and installed, in assembled condition, at the desired location.

A further object of the invention is to provide a seal unit of the above mentioned character incorporating a casing, preferably of sheet metal, adapted for press fitted engagement with a supporting structure, and in which the balls have limited radial play relative to the casing but are so arranged that press fitted engagement of the casing with the supporting structure automatically adjusts the balls to radial positions in which they are effective to center the sealing ring accurately on the supporting structure.

A further object of the invention is to provide an improved casing for use in a seal unit incorporating a series of ring mounting balls, the improved casing being constructed so that it can be manufactured very economically, as by drawing or stamping it from sheet metal.

In order to prevent axial separation of the casing and sealing ring, after the unit has been assembled and while it is being handled prior to installation in operative condition, the invention contemplates to pocket the balls in radial through apertures of the casing, so that axial thrust which is exerted by the backing unit upon the sealing ring may be transmitted from the sealing ring through the balls to the casing. The feature of utilizing balls for transmitting axial thrust from a sealing ring to a casing structure is disclosed and claimed in an application of M. Toth, Serial No. 212,071 filed on February 21, 1951, for Axial Contact Seal.

The foregoing and other objects and advantages are attained by the present invention, various novel features of which will be apparent from the description herein and the accompanying drawing disclosing an embodiment of the invention, and will be more particularly pointed out in the appended claims.

Referring to the drawing.

Figures 1, 2, 3, 4, 5:
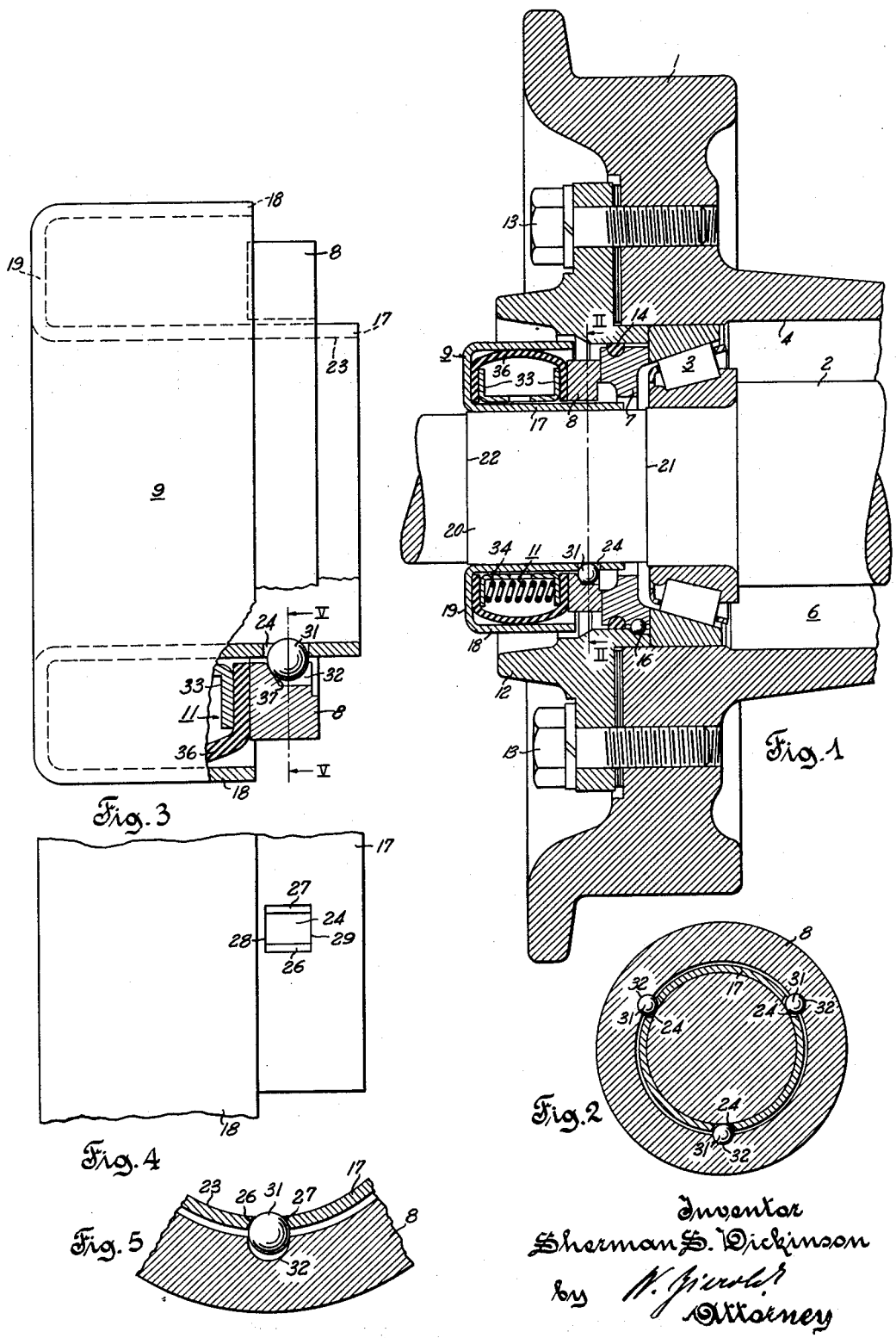
Fig. 1 is a sectional view of part of a track roller installation for crawler tractors.
Fig. 2 is a section on line II—II of Fig. 1.
Fig. 3 is an enlarged elevational view, partly in section, of a self-contained seal unit incorporated in the track roller installation shown in Fig. 1.
Fig. 4 is a radial outside view of part of a casing structure forming a component part of the seal unit shown in Fig. 3.
Fig. 5 is a section on line V—V of Fig. 3.

In the assembly of parts shown in Fig. 1, a wheel 1 forms part of a conventional track roller for crawler tractors, and a supporting shaft for the roller is generally designated by the reference character 2. In conformity with accepted practice, the shaft 2 extends through an interior hollow space of the track roller and has opposite end portions, not shown, for connection with a track frame in conventional manner. The reference character 3 generally designates one of a pair of conical roller bearings by means of which the track roller is rotatably mounted on the shaft 2 in conventional manner. An interior cylindrical surface 4 of the roller is radially spaced from the shaft 2 to provide an annular lubricant storage chamber 6 within the roller which communicates with the wearing surfaces of the roller bearing 3 as shown in Fig. 1, and which similarly communicates with the wearing surfaces of the other roller bearing, not shown.

An axial contact seal for the lubricant storage chamber 6 is shown at the left of Fig. 1, and comprises an abutment ring 7, a sealing ring 8, a sheet metal casing 9, and a resilient backing unit 11 for the sealing ring 8.

The abutment ring 7 is seated axially at one side against the outer race of the roller bearing 3 and has a radial sealing surface at its other side for cooperative engagement with the sealing ring 8. A retainer 12 for the outer race of the roller bearing 3 is secured to the wheel 1 by a circumferential series of cap screws 13, and the abutment ring 7 is mounted within the bearing retainer 12 by means of an O-ring 14 of rubber like material. A single ball key 16 is operatively interposed between the abutment ring 7 and the bearing retainer 12 so as to prevent the abutment ring 7 from rotating relative to the bearing retainer 12 and thereby relieve the O-ring from torsional driving stresses. Features of the assembly comprising the roller bearing 3 and the abutment ring 7 are disclosed and claimed in a copending application Serial No. 163,881 filed on May 24, 1950 by Frederick A. Schick for Bearing and Seal Assembly.

The casing 9 is stamped or drawn from sheet metal and forms an annular trough comprising an inner axial wall or sleeve part 17, an outer axial wall or sleeve part 18, and a radial wall 19 which connects the axial walls 17 and 18 and forms the bottom of the trough casing. The shaft 2 has a cylindrical portion 20 which extends between shoulders 21 and 22, the diameter of the shaft portion at the right of shoulder 21 being larger and the diameter of the shaft portion at the left of shoulder 22 being smaller than the diameter of the cylindrical shaft portion 20. In the assembled condition of the parts as shown in Fig. 1, the casing 9 is press fitted upon the cylindrical shaft portion 20. The radially reduced shaft portion at the left of shoulder 22 permits axial movement of the casing 9 over the shaft from left to right in Fig. 1 substantially without binding until the leading end of sleeve part 17 encounters the shoulder 22. The cylindrical casing surface 23 (Fig. 3), that is, the radially inner surface of the sleeve part 17, and the external cylindrical surface of the shaft portion 20 are so proportioned as to establish press fitted engagement of the sleeve part 17 with the shaft portion 20 upon axial movement of the casing over the shaft portion 20, friction between the casing and the shaft in their press fitted condition being effective to secure the casing in the axial position on the shaft in which it is shown in Fig. 1 and to prevent rotation of the casing on its axis relative to the shaft.

The annular end wall 19 of the casing 9 which extends radially inward from one end of the outer wall 18 is connected at its inner periphery with the inner wall 17, and the latter has an end portion which, as best shown in Fig. 3, extends axially beyond the other end of the outer wall 18. Formed in the exposed end portion of the wall 17 are three radial through apertures 24 one of which appears in each of Figs. 1, 3, 4 and 5, and all three of which appear in Fig. 2. The apertures 24 are equally spaced circumferentially of the sleeve part 17 as shown in Fig. 2, and each has two side surfaces 26 and 27 which as shown in Fig. 4 extend axially and are spaced from each other circumferentially of the sleeve part 17. As shown in Fig. 5, the axially extending side surfaces 26 and 27 converge toward the radially inner surface 23 of the sleeve part 17, that is, toward the surface of the casing 9 which is adapted for press fitted engagement with the portion 20 of the shaft 2. Transverse end surfaces 28 and 29 of each through aperture 24 extend circumferentially and are spaced from each other axially of the sleeve part 17, as best shown in Fig. 4. The side surfaces 26 and 27 of the apertures 24 are longer than the end surfaces 28 and 29, that is, the axial spacing between end surfaces 28 and 29 is greater than the narrowest peripheral width of the space between the converging side surfaces 26 and 27, as shown in Fig. 4.

In the assembled condition of the parts as shown in Fig. 1, the radial through apertures 24 of the sleeve part 17 are covered at the surface 23 of the casing by the cylindrical outer surface of the shaft portion 20. A circumferential series of steel balls 31 are pocketed, respectively, in the covered through apertures 24 of the sleeve part 17, and the sealing ring 8 has radial recesses 32 in cooperative engagement, respectively, with the balls 31 so as to establish an axially loose, radial load transmitting connection between the support afforded by the shaft 2 and the sealing ring 8, and so as to establish an axially loose torque transmitting connection between the sleeve part 17 and the sealing ring 8.

The backing unit 11 for the sealing ring 8 is of conventional construction and comprises an annular, axially expansible and contractable skeleton structure 33, a circumferential series of coil springs 34 which tend to expand the skeleton structure, and an outside wrap-around seal boot 36 of rubber like material which seals the ring 8 in axially shiftable relation to the casing 9.

In the assembled condition of the parts as shown in Fig. 1, the coil springs 34 are in a state of axial compression which causes the sealing ring 8 to bear axially upon a complementary sealing surface presented by the abutment ring 7. During rotation of the wheel 1 the abutment ring rotates with it, and the sealing ring 8 is prevented from rotating on its axis by coaction of the balls 31 with the radial recesses 32 of the sealing ring and with the inclined side walls 26 of the through apertures 24 when the wheel rotates in one direction, and by coaction of the balls 31 with the inclined side walls 27 of the through apertures when the wheel rotates in the other direction. The axial length of the apertures 24 is such as to permit limited back and forth rolling movement of the balls 31 on the shaft portion 20 in the axial direction of the shaft, while the balls are effective to accurately center the sealing ring 8 on the shaft. Due to the ability of the balls 31 to roll axially on the shaft portion 20, the sealing ring is not apt to become stuck in the position in which it is shown in Fig. 1, but is free at all times to adjust itself axially under the pressure of the backing unit 11, and also tiltably relative to the shaft and relative to the casing 9, to proper sealing engagement with the abutment ring 7.

The casing 9, the sealing ring 8, the backing unit 11 and the balls 31 are combined to form a compact, self-contained unit which is shown per se in Fig. 3, and which may readily be handled and installed in assembled condition at the desired location. In the assembled condition of the parts as shown in Fig. 3, the balls 31 are pocketed, respectively, in registering pairs of through apertures 24 and radial ring recesses 32, and as best shown in Fig. 5, the diameters of the balls are sufficiently large so that the balls cannot pass through the radial apertures 24 in the sleeve part 17. Each of the radial recesses 32 in the sealing ring 8 presents a bearing surface 37, as shown in Fig. 3, in axial thrust transmitting relation to the respective ball 31, so that movement of the sealing ring 8 under the pressure of the backing unit 11 toward the free end of the sleeve part 17 will be limited by cooperative engagement of the bearing surfaces 37 with the balls 31 and by cooperative engagement of the balls 31 with the end surfaces 29 of the through apertures 24. The radial recesses 32 in the sealing ring 8 are preferably formed by drilling so that the bearing surfaces 37 are formed incidental to such drilling operation. Employment of an ordinary spiral drill which is advanced axially of the ring 8 will cause the surfaces 37 to have a conical slant toward the inner periphery of the sealing ring 8, as shown in Fig. 3. The diameter of the drill employed is equal to or slightly larger than the diameter of the ball 31 which is to be pocketed in the ring recess 32 formed by the drill.

In the condition of the parts as shown in Fig. 3, the ball 31 is seated radially of the casing 9 on both side surfaces 26 and 27 of the through aperture 24, as shown in Fig. 5, and the ball 31 bears axially of the casing 9 against the transverse end wall 29 of the through aperture 24 at the edge next to the inner periphery of the sealing ring 8. This condition exists at each of the three balls 31, and is maintained by the action of the coil springs 34 of the backing unit 11, which are in a state of axial compression, and by coaction of the conically slanted bearing surfaces 37 with the balls 31.

Radial seating of the balls 31 on the converging side surfaces 26 and 27 of the through apertures 24, as illustrated by Figs. 3 and 5, causes the balls to partly project into the space which is defined by the casing surface 23. When the casing is moved axially over the shaft from left to right in Fig. 1, the projecting portions of the balls strike the shoulder 22, and continued axial movement of the casing toward the abutment ring 7 will then cause the balls to move radially of the casing 9 to the positions, as shown in Figs. 1 and 2, in which they are operative to support the sealing ring for substantially frictionless axial back and forth movement relative to the shaft 2, and to maintain the sealing ring in radially centered condition by direct coaction of the balls with the radial recesses of the sealing ring and with the cylindrical surface of the shaft portion 20, and to lock the sealing ring against rotation on its axis by coaction of the balls with the radial recesses of the sealing ring and with one or the other of the side surfaces 26 and 27 of the radial through apertures 24 of the sleeve part 17.

For purposes of assembly and disassembly, the sealing ring 8 may be manually displaced, against the action of the backing unit 11, from the position in which it is shown in Fig. 3. Such displacement of the sealing ring, that is, toward the bottom of the trough casing 9, will release the balls from the locked condition in which the ball 31 is shown in Fig. 3, so that they may readily be removed from the apertures 24 and from the radial recesses 32. Similarly, the balls may readily be inserted into the apertures 24 while the sealing ring 8 is held back, and subsequent release of the sealing ring will then enable the coil springs 34 of the backing unit to move the ring 8 toward the free end of the sleeve part 17 and thereby entrap the balls between the sleeve part 17 and the sealing ring as shown in Fig. 3.

It should be understood that it is not intended to limit the invention to the particular forms and details described hereinabove and that the invention includes such other forms and modifications as are embraced by the scope of the appended claims.

It is claimed and desired to secure by Letters Patent:

1. In a sealing device comprising a support and an annular casing structure having a sleeve part in separable, press fitted engagement at one of its radially spaced inner and outer surfaces with said support, the combination of a circumferential series of radial through apertures formed in said sleeve part and covered at said one sleeve part surface by said support, a sealing ring, means mounting said sealing ring coaxially with said support and in radially spaced relation to said sleeve part, said means comprising a circumferential series of balls pocketed, respectively, in said covered through apertures and bearing radially upon said support independently of said casing structure, and radial recesses formed in said sealing ring for cooperative engagement, respectively, with said balls so as to establish an axially loose radial load transmitting connection between said support and said sealing ring and an axially loose torque transmitting connection between said sleeve part and said sealing ring, and means connecting said sealing ring in sealed and axially yieldable relation with said casing structure, said balls and apertures being relatively proportioned so that said balls will not pass through said apertures when said casing is removed from said support.

2. In a sealing device comprising a shaft element and an annular casing structure having a sleeve part in separable, press fitted engagement at its inner surface with a cylindrical outer surface portion of said shaft element, the combination of a circumferential series of radial through apertures formed in said sleeve part and covered at said inner sleeve part surface by said cylindrical outer surface portion of said shaft element, a sealing ring, means mounting said sealing ring in surrounding radially spaced relation to said sleeve part, said means comprising a circumferential series of balls pocketed, respectively, in said covered through apertures and bearing upon said shaft element independently of said casing structure, and radial recesses formed in said sealing ring at its inner periphery for cooperative engagement, respectively, with said balls so as to establish an axially loose radial load transmitting connection between said shaft element and said sealing ring and an axially loose torque transmitting connection between said sleeve part and said sealing ring, and means connecting said sealing ring in sealed and axially yieldable relation with said casing structure, said balls and apertures being relatively proportioned so that said balls will not pass through said apertures when said casing is removed from said support.

3. A sealing device comprising, in combination, an annular casing structure having a sleeve part adapted for press fitted engagement at one of its radially spaced inner and outer surfaces with a support, a circumferential series of radial through apertures formed in said sleeve part, a sealing ring disposed in axially overlapping radially spaced relation to the other of said inner and outer surfaces of said sleeve part and having a circumferential series of radial recesses in registering relation, respectively, with said through apertures, a series of balls pocketed, respectively, in registering pairs of said through apertures and recesses so as to bear radially inward upon said support and radially outward upon said sealing ring independently of said casing structure and having diameters sufficiently large to prevent passage of said balls through said apertures, and means operatively interposed between said casing structure and said sealing ring for establishing an axially loose sealing connection between said sealing ring and said casing structure and for urging said sealing ring axially in one direction relative to said casing structure.

4. A sealing device as set forth in claim 3, in which said radial recesses of said sealing ring present bearing surfaces in axial thrust transmitting relation to said balls so that movement of said sealing ring in said one direction will be limited by cooperative engagement of said bearing surfaces with said balls and by cooperative engagement of said balls with end walls of said through apertures in said sleeve part of said casing structure.

5. A sealing device as set forth in claim 3, in which said through apertures in said sleeve part of said casing structure present longitudinal side surfaces extending axially and spaced from each other circumferentially of said sleeve part, and transverse end surfaces extending circumferentially and spaced from each other axially of said sleeve part.

6. A sealing device as set forth in claim 5, in which said longitudinal side surfaces are longer than said end surfaces.

7. A sealing device as set forth in claim 5, in which said side surfaces are inclined so as to converge in the direction toward the surface of said sleeve part which is adapted for press fitted engagement with a support.

8. A sealing device comprising, in combination, an annular casing structure having a sleeve part adapted for press fitted engagement at its inner periphery with a cylindrical surface of a shaft element, a circumferential series of radial through apertures formed in said sleeve part, a sealing ring surrounding said sleeve part and having a circumferential series of radial recesses at its inner periphery in registering relation, respectively, with said through apertures, a series of balls pocketed, respectively, in registering pairs of said through apertures and recesses so as to bear radially inward upon said shaft element and radially outward upon said sealing ring independently of said casing structure and having diameters sufficiently large to prevent passage of said balls through said apertures, and means operatively interposed between said casing structure and said sealing ring for establishing an axially loose sealing connection between said sealing ring and said casing structure and for urging said sealing ring axially in one direction relative to said casing structure.

9. A sealing device as set forth in claim 8, including means for limiting axial movement of said sealing ring in said one direction relative to said casing structure.

10. A sealing device as set forth in claim 8, in which said through apertures and said balls are relatively proportioned so that upon removal of said casing structure, sealing ring and balls from said shaft element said balls may be seated in pocketed condition within said through apertures while partially projecting beyond said inner periphery of said sleeve part.

11. A sealing device as set forth in claim 8, including means for limiting axial movement of said sealing ring in said one direction relative to said casing structure comprising bearing surfaces presented by said radial recesses of said sealing ring in axial thrust transmitting relation to said balls so that movement of said sealing ring in said one direction will be limited by cooperative engagement of said bearing surfaces with said balls and by cooperative engagement of said balls with end walls of said through apertures.

References Cited in the file of this patent

UNITED STATES PATENTS

| | | |
|---|---|---|
| 1,208,252 | Westinghouse | Dec. 12, 1916 |
| 1,532,743 | Hadsel | Apr. 7, 1925 |
| 1,763,332 | Sykes | June 10, 1930 |
| 1,972,779 | Kradoska | Sept. 4, 1934 |
| 2,089,773 | Vedovell et al. | Aug. 10, 1937 |
| 2,444,699 | Hastings et al. | July 6, 1948 |

FOREIGN PATENTS

| | | |
|---|---|---|
| 626,779 | Great Britain | July 21, 1949 |
| 752,065 | France | July 10, 1933 |